Feb. 7, 1950 A. BRIECHLE ET AL 2,496,329
VARIABLE FILM EXPOSURE APERTURE AND FILM FEED
Filed Sept. 14, 1945 4 Sheets-Sheet 2

INVENTOR
Ambrosius Briechle
Ernest C. Worden
BY
ATTORNEY

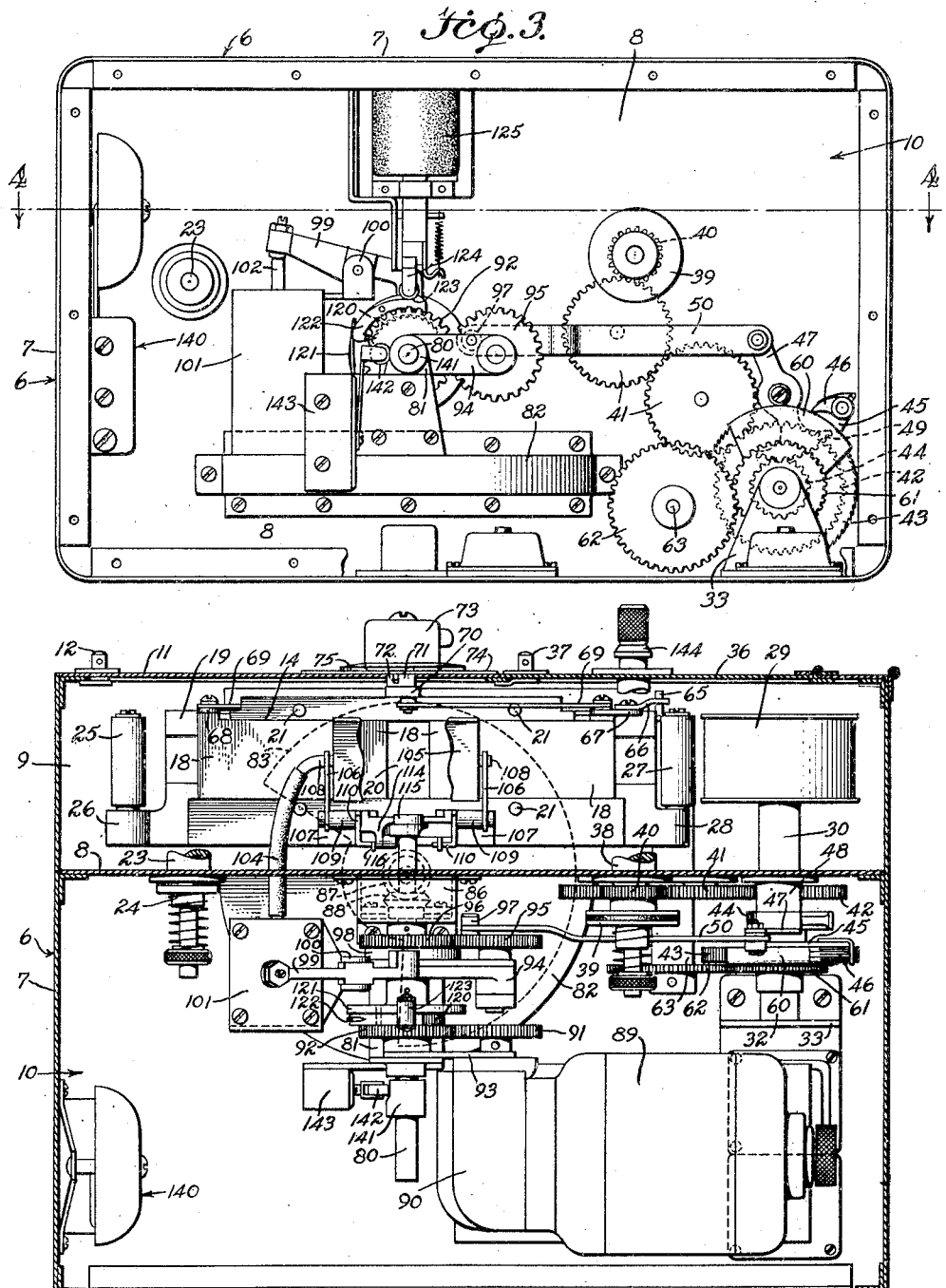

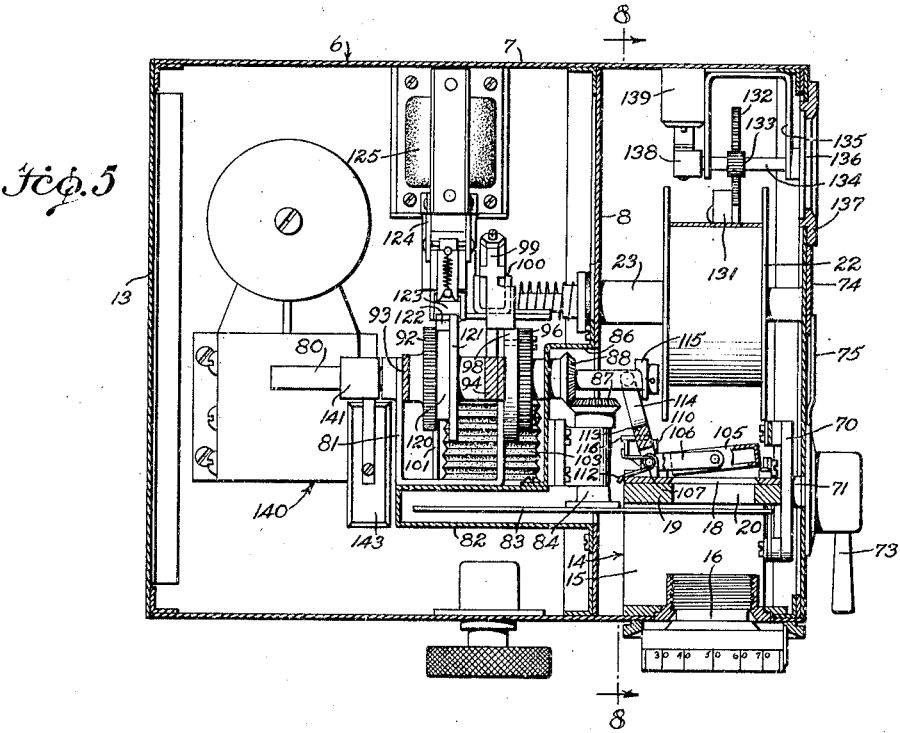

Patented Feb. 7, 1950

2,496,329

UNITED STATES PATENT OFFICE 2,496,329

VARIABLE FILM EXPOSURE APERTURE AND FILM FEED

Ambrosius Briechle, Brooklyn, N. Y., and Ernest C. Worden, East Norwalk, Conn., assignors to Remington Rand Inc., Buffalo, N. Y., a corporation of Delaware Application September 14, 1945, Serial No. 616,172

9 Claims. (Cl. 95—31)

1

This invention relates to photographic apparatus particularly adapted for making microphotographs of documents.

The invention comprehends the provision of a photographic camera that is constructed and arranged for convenient operation in taking photographs of documents of different size for producing images of substantially uniform width on a uniform size of film strip.

The invention provides means for supporting and feeding a film strip of uniform width through the focal plane of an objective carried by the camera, with means for varying the size of the exposure aperture also arranged to control the amount of film feed in proportion to the size of the exposure aperture so that the images of documents photographed on the film will be close together to avoid waste of film. At the same time, the camera is arranged to photograph documents of varying size so that the narrow dimension of the document will be photographed on the film in a position to extend from edge to edge of the film, while provision is made through the adjustment of the size of the exposure aperture to photograph the larger dimension of the document on the film within the limits of adjustment provided.

The invention provides a camera that will photograph documents of different size on a uniform size of film in which the camera is moved toward or from the document according to the variation in size thereof so that the image of the document on the film will cover substantially the entire area between the side edges, while provision is made to have the successive documents on the film arranged with the images in adjacent relation lengthwise of the film by means of suitable mechanism for varying the size of the exposure aperture which may be adjusted for each picture taken and is arranged to simultaneously adjust the feed of the film, while suitable operating and control means provides for the operation of the camera through a cycle of movements to photograph a document and feed the film upon the operation of a manual control that will start a complete cycle of movements to complete the taking of one photograph.

The invention comprehends the provision of a document photographing camera having a guideway for guiding the film through the photographic plane with a pad hingedly mounted on the guideway and adapted to be normally moved and resiliently held in contact with the film for holding it against the guideway in the focal plane with a suitable mechanism for adjusting the size of the photographic aperture, moving the pad

2 away from the film and the guideway during the film feeding operation while at the same time controlling the size of the photographic aperture and extent of the film feed by suitable controlling and operating means that may be manually released to secure a cycle of operations in the camera in feeding the film and taking a picture of a document.

In the drawings:

Fig. 3 is an enlarged rear view of the camera with the rear cover plate removed illustrating the mechanism in the rear compartment of the camera in elevation and having the motor unit for driving the camera removed, in order to illustrate details of construction.

Fig. 4 is a horizontal cross-section taken on line 4—4 of Fig. 3.

Fig. 5 is a vertical transverse cross-section taken on line 5—5 of Fig. 2.

Fig. 6 is an enlarged vertical longitudinal cross-section through the guideway.

Figure 1:
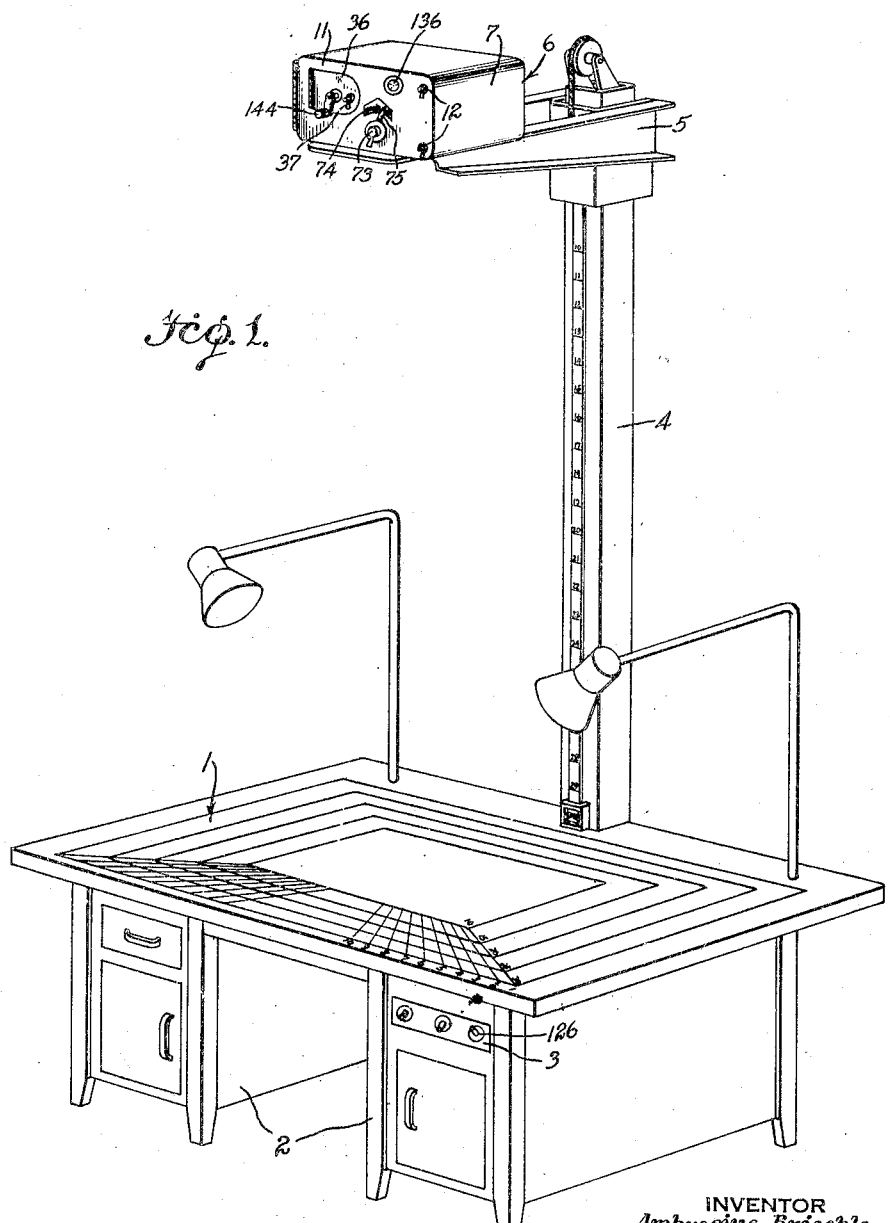
Fig. 1 shows a document photographing machine in perspective illustrating how the camera is mounted on a support movable on a column relative to a substantially horizontal copy supporting table with means for remotely controlling the operation of the camera.

The photographic apparatus of the present invention includes a desk having a top forming a copy table, indicated at 1 in Fig. 1, with pedestals 2 provided for support at the bottom on the floor of a building or the like, in a well-known manner. The desk is constructed so that the right-hand pedestal is provided at the front end with a control panel 3 having a plurality of controls, some of which are connected with the camera for controlling the operation thereof. A tubular column 4 extends vertically from the rear central portion of the desk and carries an adjustable camera support 5 movable up and down on the column in photographing documents of different size. The photographic camera 6 is detachably mounted on the support 5 in a centered position over copy table 1. Camera 6 includes the structure having the principal features of invention comprehended by this application.

Camera 6 comprises a light-tight casing having an outer rectangular shell 7 open at both ends. Intermediate the ends of shell 7 and toward the front center portion is located a partition wall 8 that divides the camera case into front and rear compartments 9 and 10 respectively. Partition wall 8 also provides a support for a portion of the apparatus used in taking pictures. A door 11 hinged at one side to the front edge of shell 7, as shown in Fig. 4, is constructed to close the front compartment 9 in light-tight relation. Suitable latches 12 are manually operable to secure door 11 in closed position. A detachable rear wall 13 closes the rear end of shell 7 to provide a complete closed casing for the mechanism of the camera.

Figure 2:
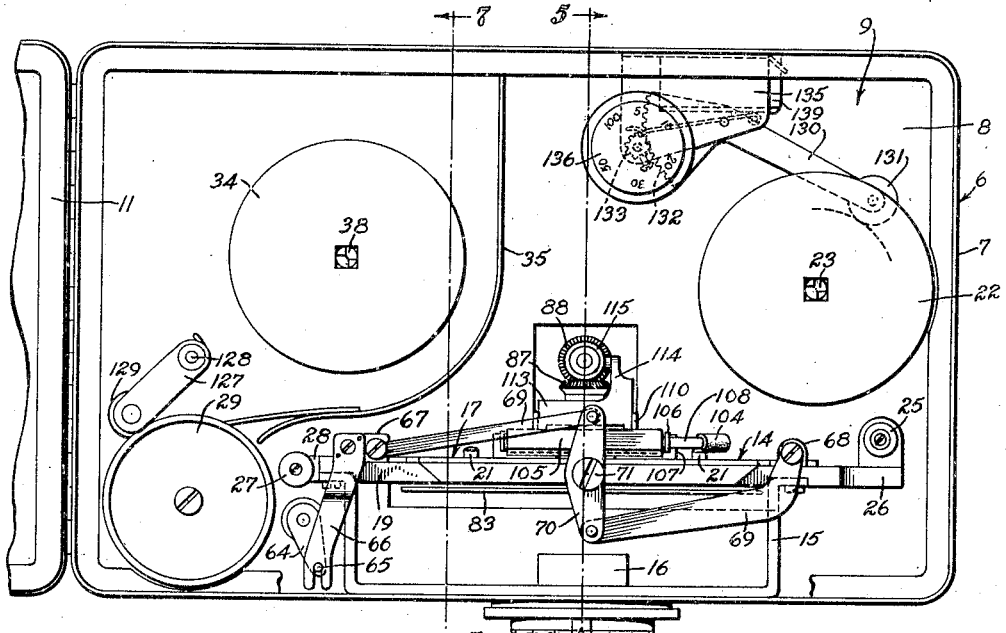
Fig. 2 is a front elevation of the camera on an enlarged scale, shown with a door providing access to the interior in open position and showing the mechanism inside the camera body in front elevation.
Figure 8:
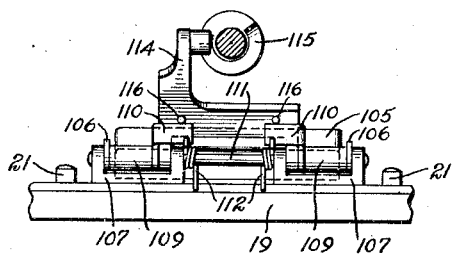
Fig. 8 is an enlarged detail view showing the mounting structure for the film holding pad on the guideway taken from a position along line 8—8 of Fig. 5 with the remaining portions of the camera and mechanism omitted.
Figure 7:
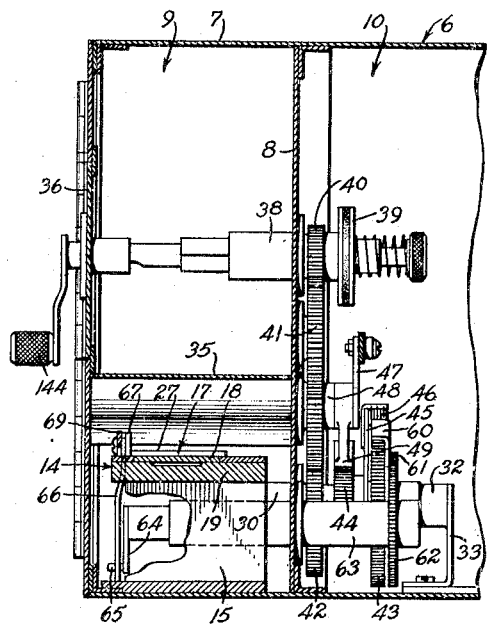
Fig. 7 is a vertical transverse cross-section taken on line 7—7 of Fig. 2.

A film guideway 14 includes a U-shaped bracket 15 having a central portion mounted on the bottom of shell 7 and supporting an objective 16 in the central portion thereof, as shown in Figs. 2, 5 and 6. The objective is provided with suitable means for adjusting the focal length for the various positions of the camera relative to the copy table in order that an image of a document or other object on the copy table will be focused on the film strip in a fixed focal plane. This focal plane is indicated at 17 along the upper face of a pair of plates 18 slidably mounted on film guide plate 19 carried by the free ends of U-shaped bracket 15. Guide plate 19 is formed with a groove in the upper face that has the portions at the sides of the groove undercut to receive the beveled edges of plates 18 for slidably mounting plates 18 on film guide plate 19. The upper face of guide plate 19 adjacent the sides of plates or slide members 18 is in coplanar relation to the upper surface of plates 18 and lies in focal plane 17. The central portion of film guide plate 19 is formed with an exposure aperture 20, while plates 18 are slidable toward and from each other so that the adjacent ends are adapted to cooperate and control the size of the exposure aperture through which the image of a document or the like is focused on the film in a manner that will be clear from the illustration in Fig. 6. Guide pins 21 are mounted on the side margins of film guide plate 19 and are adapted to be engaged by the edge of a film strip holding the film against sidewise movement as it passes over plates 18 and guide plate 19 for the photographing of images thereon in the focal plane through the exposure aperture.

A film supply spool 22 carries a supply of strip film of suitable length, such as 35 mm. sensitized film of a character well-known in the art. Spool 22 is mounted on a spindle 23 rotatably mounted in partition wall 8. Spindle 23 is provided with a friction clutch arrangement indicated at 24, for normally holding the spool against rotation, but providing when a suitable tension is applied to the film, to rotate in the feed of the film for discharging the film from the spool in the taking of pictures. A uniform tension is thus maintained on the film which passes over idler roller 25 rotatably mounted on a spindle carried by film guide plate 19 through the medium of a projection 26 extending outwardly from the inner left-hand end of plate 19, as clearly shown in Fig. 4. The film supply spool 22 and spindle 23 are positioned in the right-hand side of front compartment 9 as viewed from the front of the shell, as shown in Fig. 2.

As the film leaves idler roller 25, it passes in a rather straight path over the upper surface of plates 18 and film guide plate 19 where it is guided by guide pins 21 through the focal plane of objective 16 and over exposure aperture 20. The film is then guided over idler roller 27 rotatably mounted on a spindle carried by projection 28 extending from the opposite end of film guide plate 19 from the one formed with projection 26. The film then extends from idler roller 27 about film feed drum 29 mounted on shaft 30 of a film feeding means or mechanism. Shaft 30 is rotatably mounted in the bearing 31 carried by partition 8 and a bearing 32 carried by the upper end of an angle bracket 33 secured to the bottom portion of shell 7, as illustrated in Figs. 3 and 4.

The film passes from film feed drum 29 to receiving spool 34 at the left-hand side of front compartment 9, looking at the front of the camera, as shown in Fig. 2. This receiving spool is in a separate light-tight portion of compartment 9 provided by a curved division wall 35 constructed so that a small film removal door 36 forming part of door 11 may be swung to open position on its hinged mounting on door 11 by the release of latch 37. When latch 37 is released and door 36 is open, access is provided through an opening in door 11 to the compartment containing the receiving reel so that it may be removed with the film wound thereon in a convenient manner and replaced by a similar spool on which the film in the camera may be wound in the continued operation of the camera.

The receiving spool 34 is mounted on spindle 38 rotatably carried by a bearing in partition wall 8 and having a portion extending through into the rear compartment 10 where the spindle carries a friction drive disc structure indicated at 39 and a freely rotatable driven gear 40 through which motion is transmitted to the friction disc drive 39 for winding film on the receiving spool. Driven gear 40 forms part of the film feed mechanism with friction drive 39 and has a train of gears clearly shown in Figs. 3 and 4 indicated at 41 for transmitting motion from a driving gear 42 rigidly mounted between bearings 31 and 32 on spindle shaft 30 in rear compartment 10. Ratchet wheel 43 is also fixed on spindle shaft 30.

A ratchet gear 44 is rotatably mounted on spindle shaft 30 adjacent ratchet wheel 43 and has a ratchet arm 45 rigidly connected thereto and extending in radial relation therefrom for carrying ratchet pawl 46 on the free end thereof to engage with adjacent teeth on ratchet wheel 43.

An arm 47 is mounted intermediate its ends for oscillating movement on a bearing stud 48 carried by partition wall 8 in vertical alignment above the spindle shaft bearing carrying spindle shaft 30 on partition wall 8. Bearing stud 48 projects from partition wall 8 into rear compartment 10 to support arm 47 in alignment with ratchet gear 44 so that an arcuate rack 49 on one end of arm 47 has the teeth thereon intermeshed with ratchet gear 44. The opposite end of arm 47 is pivotally connected to a drive link 50. By the oscillation of arm 47 through the operation of drive link 50, it will oscillate ratchet arm 45 so that pawl 46 will intermittently engage the teeth of ratchet wheel 43 and rotate the same in one direction for winding film on receiving spool 34. This operation for winding film is transmitted from ratchet wheel 43 to shaft 30 and by driving gear 42, idler gears 41 to driven gear 40 and then through friction drive 39 to spindle 38 carrying the receiving spool. If the tension on the film at the receiving spool gets too great, the friction drive will provide for slippage in the film drive mechanism in order to avoid breakage of the film.

The normal operation of arm 47 is of a uniform character so as to provide oscillation of ratchet arm 45 to feed a uniform amount of film through the engagement of pawl 46 with the ratchet teeth on ratchet wheel 43. However, means is provided for varying the amount of film feed in accordance with variations in the size of the exposure opening controlled by the distance between the adjacent ends of slidable plates 18. For this purpose, a segment 60 is rotatably mounted on spindle drive shaft 30 adjacent bearing 32 with an attached actuating gear 61. The segment is arranged to provide an arcuate flange extending in spaced relation about the periphery of the ratchet teeth on ratchet wheel 43 between the ratchet teeth and ratchet pawl 46 so that, depending upon the position of segment 60, part of the oscillating movement of ratchet arm 45 will take place while the free end of ratchet pawl 46 rides on the surface of segment 60 so that it is held in an inoperative position out of contact with the ratchet teeth on ratchet wheel 43. Depending upon the position of segment 60, the film feed may be operated to feed a smaller or greater amount of film up to the limit of feed that may be obtained by the oscillating motion of ratchet arm 45. A gear 62 in mesh with gear 61, is carried by a feed adjusting shaft 63 rotatably mounted in partition wall 8. Shaft 63 extends from the rear compartment 10 through the partition wall into the front compartment where it carries a crank arm 64 on the front end. A crank pin 65 on the free end of crank arm 64 engages in the bifurcated end of arm 66 mounted on bracket 67 carried by one of the slide plates 18. The other slide plate 18 has a bracket 68 thereon. Two adjusting links 69, each has one end pivotally connected to one of the brackets 67 and 68 and the opposite ends connected to opposite ends respectively, of a rotary control member 70 pivotally mounted at the center on the front edge of film guide plate 19.

Rotary control member or bar 70 has a hub forming one element 71 of a disengageable clutch formed on the central front face thereof while the other element 72, see Fig. 4, is carried at the inner face of door 11 by the handle 73 rotatably mounted in door 11 and adapted for manual operation to engage the clutch elements 71 and 72 and rotate rotary control member 70 for adjusting the size of the exposure aperture and segment 60 to control the film feed. A dial plate 74 is mounted on the front face of door 11 about handle 73 and provided with suitable graduations to indicate the adjustment of handle 73 which carries an indicator 75 for cooperation with the graduations on dial plate 74. The disengageable clutch elements 71 and 72 provide for opening and closing of door 11 so that they are engaged in the closed position of door 11, as shown in Fig. 4, for the adjustment of the control member 70 by rotation of handle 73. This adjustment of control member 70 operates through links 69 to slidably move plates 18 toward and from each other to increase or decrease the length of film exposed through exposure aperture 20 and thereby control the size of the exposure aperture. At the same time, the adjustment of control member 70 in operating plates 18, also moves arm 66 therewith and through crank arm 64 rotates segment 60 for controlling the film feed so that it will feed a greater or less amount of film to correspond with the adjustment of plates 18. The film feed is designed so that a length of film will be fed to equal the distance between the adjacent ends of plates 18 in any adjusted position thereof and a slight additional amount sufficient to space the images on the film apart a slight distance and at the same time avoid unnecessary waste of film. It will be noted that the adjustment of the plates 18 is in the direction of the length of the film as it passes over and is supported on the upper face of these plates and in line with the direction of feed of the film over the film guideway.

The camera drive mechanism has a main drive shaft 80 rotatably mounted in a U-shaped bearing bracket 81 mounted on a rearwardly extending shutter housing 82 carried by partition wall 8. Shutter housing 82 is mounted over a slot formed in partition wall 8 to provide a compartment extending to the rear of partition wall 8 for providing space in which the rotary disc shutter 83 operates. This shutter has the forward peripheral portion thereof extending into the space between objective 16 and film guide plate 19 so as to control the recording of images on the film through exposure aperture 20. Rotary disc shutter 83 has a removed segmental portion, as shown in Fig. 4, arranged to expose the film through aperture 20 in the guideway when it registers with exposure aperture 20. Disc shutter 83 is mounted on shaft 84 rotatable in bearing 85 mounted on the front portion of a cover plate 86 secured to the rear face of partition wall 8 and the upper portion of shutter housing 82 to close an opening in partition wall 8 in light-tight relation and provide space for parts of the shutter drive mechanism. A bevel gear 87 is mounted on the upper end of shaft 84 and intermeshes with a bevel gear 88 mounted on the forward end of main drive shaft 80 in the space provided by cover plate 86, as shown in Fig. 5. Shutter 83 is therefore rotated in the rotation of shaft 80.

Main drive shaft 80 is driven by an electric motor 89 through a suitable reduction drive of conventional form operating a drive gear 91 intermeshed with driven gear 92 on the rear end of main drive shaft 80 adjacent the rear leg of U-shaped bearing bracket 81. A link 93 is rotatably mounted on the shaft carrying gears 91 and 92 for holding the gears intermeshed.

An arm 94 extends laterally from the forward upper end of bracket 81 for rotatably supporting a gear 95 intermeshed with a gear 96 on main drive shaft 80 and driven thereby in the rotation of shaft 80. Gear 95 has one end of drive link 50 rotatably connected to an eccentric pin 97 thereon, as shown in Figs. 3 and 4. This provides for the driving of the film feed mechanism in the manner above described from main drive shaft 80 by motor 89 through the power supplied by rotation of gears 95 and 96 to provide a uniform oscillating movement of eccentric arm 45 in the operation of main drive shaft 80.

A cam 98 is mounted on drive shaft 80 adjacent and in the rear of gear 96 for engaging and oscillating rocker arm 99 pivoted intermediate its ends in a bearing support 100 carried by bellows-supporting bracket 101 mounted on shutter housing 82, as shown in Figs. 3 and 4. The opposite end of rocker arm 99 engages a reciprocating pin 102 slidably mounted in the upper end of bellows bracket 101 and extends through the bracket for operating a bellows 103. In the operation of rocker arm 99 by cam 98, the bellows will be alternately compressed to exclude the air therefrom. The bellows is normally expanded by a spring, not shown, which maintains the end of rocker arm 99 in contact with the periphery of cam 98. Bellows 103 has a pipe connection 104 with pad 105 carried by a pair of independently mounted rocker arms 106 pivoted in brackets 107 mounted on the inner edge of film guide plate 19, as clearly shown in Fig. 4.

Pad 105 is positioned in centered relation above exposure aperture 20 and the opening between the inner ends of slide plates 18. This pad 105 is provided to normally hold the film flat against the upper surface of plates 18 and guide plate 19 in the focal plane of objective 16. Pad 105 has a pair of trunnions 108 on opposite ends thereof, the one on the left-hand end as shown in Fig. 4, being hollow or tubular to receive the pipe connection 104 from the bellows. These trunnions provide for a free hinged mounting of pad 105 in arms 106 and since these arms are independently movable on their mounting and supporting brackets 107, pad 105 has a floating mounting of a type that permits it to firmly hold all portions of the film which it engages against plates 18. Pad 105 is of hollow construction and has a plurality of slots on the bottom face so that suction from the bellows will operate through the interior of the pad and the slots on the film engaged thereby.

The bellows is provided for creating a suction through pipe 104 in pad 105 so that when the pad is in position against the film holding it against guideway 14, the suction may be applied in order to hold all portions of the film over exposure aperture 20 in a flat condition against the bottom face of the pad. This holding of the film takes place during a dwell in the intermittent feed of the film.

Arms 106 are rigidly connected to the ends of sleeves 109 rotatable on a pin carried by brackets 107. The inner ends of sleeves 109 carry arms 110, each having a lateral extension on the free end. Springs 112 are mounted on pin 111 carried by brackets 107 with end portions engaging brackets 107 and arms 110 and arranged to normally exert resilient pressure on arms 110 to move pad 105 toward the film guideway.

A pad actuating member 113 of U-shaped construction, has the ends rotatably engaged on pin 111 with a projection 114 on the upper end thereof carrying a roller adapted to engage cam 115 on the forward end of main drive shaft 80. Pins 116 projecting rearwardly from the lower portions of the legs of U-shaped member 113 engage the upper edges of arms 110 and are arranged so that when the wide portion of cam 115 operates pad actuating member 113, pins 116 will engage arms 110 and move them downwardly about their pivotal mounting on brackets 107. This, in turn, will rotate sleeves 109 and operate arms 106 to lift the pad away from the film guideway against the tension of spring 112 and disengage it from the film, as shown in Fig. 5. The pad is held in this disengaged position during the feeding of film across guideway 14. The operation of this pad 105 is such that when the feed of film is completed and its motion stopped, pad 105 will be released by the operation of cam 114 so that springs 112 will come into play to individually operate arms 106 and move the pad in its floating mounting in the arms into engagement with the film for compressing it against the film guideway. This holding of the film is maintained throughout the photographing operation during which time, bellows 103 is operated to create a suction in the pad to additionally hold the film while the shutter is exposing an image for photographing on the sensitized surface of the film through exposure aperture 20 and objective 16.

Driven gear 92 has a ratchet wheel 120 mounted thereon for free rotation on shaft 80 while drive disc 121 is rigidly mounted on drive shaft 80 and carries a main drive pawl 122 for engagement with the teeth on ratchet wheel 120. Pawl 122 is normally spring actuated to engage the ratchet teeth on ratchet wheel 120 and is held in disengaged relation by a bearing roller 123 carried by slidable control member 124 forming the armature of an electromagnet 125 mounted on the upper portion of shell 7 within compartment 10, as clearly shown in Figs. 3 and 5.

In the position of rest of drive disc 121, roller 123 engages in a recess in the periphery of the disc in the manner shown in Fig. 3. In this position, roller 123 engages one end of main drive pawl 122 and disengages the opposite end thereof from ratchet wheel 120 to arrest the motion of main drive shaft 80 so that it will not be driven from the motor which operates continuously in the normal operation of the camera. Whenever electromagnet 125 is energized, it will operate control member 124 to remove roller 123 from the notch in disc 121 thereby releasing main drive pawl 122 for engagement with ratchet wheel 120 for operating the camera mechanism. Electromagnet 125 is connected in a suitable electric circuit with a switch 126 mounted on control panel 3 and manually operable to close the circuit to electromagnet 125 for securing operation of the camera. Operation of electromagnet 125 in releasing pawl 122, will secure one cycle of operation of the camera through the rotation of shaft 80 and disc 121 one revolution.

A spring actuated arm 127 is pivotally mounted on a stub shaft 128 and carries a roller 129 in the free end thereof adapted to engage the film as it is fed about drum 29 for tightly holding the film about said drum and in engagement with the drum for positive feeding thereby.

A film footage indicator and exhaust signal is operated by an arm 130 mounted on pivot 130'. Roller 131 on arm 130 is adapted to engage the outer convolution of film on supply spool 22 in operating the film footage indicator and film exhaust signal. Arm 130 has the end opposite that carrying roller 131 formed with a rack segment 132 meshing with pinion 133 carried by shaft 134 journalled in U-shaped bracket 135 mounted in front compartment 9 on the upper inner face of shell 7. At the forward end, shaft 134 carries a footage indicator dial 136 having light-tight cooperation with indicator ring 137 mounted in an aperture in door 11. In the closed position of door 11, dial 136 cooperates with ring 137 to indicate the film footage contained on film supply spool 22.

The inner end of shaft 134 is provided with a cam 138 positioned so that, in the operation of shaft 134 through one revolution to indicate film footage on spool 22 from the full to the empty condition thereof, cam 138 will have the node thereon arranged to actuate micro-switch 139 connected for closing an electric circuit to annunciator 140 and audibly signal the empty condition of film spool 22.

From the foregoing description, it will be understood that the camera as disclosed herein, is adapted to take pictures of documents of varying size that are positioned on copy table 1. In making photographs with the present camera, it is desired to secure an image of a document of any size within the range of the optical system provided which will occupy substantially the entire width of the fixed size of film used, such as 35 mm. film. This camera is also designed to economically use film by providing for a small space of a fixed character between the ends of images photographed on the film in the lengthwise direction thereof.

In photographing documents with this camera, arrangements are made for determining the size of the document in advance, in a convenient manner by providing the copy table with suitable markings for documents of different size to indicate the setting of the camera and the document position on the copy table. A document is placed in centered position on copy table 1 and by the scale on the copy table, the operator in front of the copy table determines the position for the camera on column 4 and the position for setting other adjustments. Objective 16 is then adjusted for the proper focus at the given distance of the camera from the copy table. Handle 73 is operated to adjust plates 18 for the size of the document lengthwise of the film. The operation of this handle as above described, not only adjusts plates 18 to set the size of the exposure aperture for the film to a desired size, but it also sets the segment 60 so that only a sufficient amount of film will be fed to provide the desired space between the ends of adjacent images on the film in addition to the size of the image to be produced on the film. However, for all adjustments of this mechanism, shaft 80 is operated through one rotation providing one complete cycle of operation of the entire camera mechanism.

When the adjustment of the camera on column 4 is completed and the handle 73 operated to set the exposure aperture and film feed to the proper adjustment with objective 16 adjusted into proper focal position, the document is then about ready to be photographed. It will be understood that the control switches for the lamps providing artificial illumination for the document on copy table 1 and the switches for the various electric circuits to the camera will have been operated so that all parts of the photographic apparatus are in operative condition. These switches are all mounted on control panel 3 and since the construction and circuit arrangement of these switches and some of the apparatus they control are not part of the present invention and are also well-known in the art, they are not herein described.

With the parts in an operative condition, as above described, manual operation of switch 126 will energize electromagnet 125 and move control member 124 upwardly to disengage the roller from the notch in disc 121 whereupon disc 121 will be rotated one revolution by the operation of motor 89 which has been previously continuously running through the energization of the circuit thereto. The operation of the parts in the camera are timed so that, as illustrated in the drawings, the film feed mechanism will be first operated to feed the film so as to bring an unexposed portion of film over the exposure aperture formed by plates 18 and film guide plate 19. This feeding of the film takes place in the first half revolution of disc 121 with shaft 80 through the operation of drive link 50, in the manner above described.

Then, cam 115 is rotated into a position so that springs 112 will operate through arms 106 to move pad 105 into position against the upper face of the film and hold it in the focal plane over the exposure aperture against the upper surface of plates 18 and film guide plate 19. Then, cam 98 having been operated to compress the bellows so as to exclude a portion of the air therefrom, will then provide for the quick release of rocker arm 99 so that the spring operating the bellows can become immediately active to create suction in pad 105 and suck the film over the exposure aperture tightly against the face of pad 105. While the suction holds the film against pad 105, the operation of shaft 80 will move shutter disc 83 so that the removed segment thereof will register with the exposure aperture and result in exposure of the film in the focal plane to receive an image of the document on copy table 1. This operation occurs in the second half of the cycle of rotation of shaft 80 and disc 121. When one revolution of shaft 80 and disc 121 is completed, the photographing of the document is completed and the parts are restored to their starting position so that when disc 121 is again released for operation, another photograph of a document is made on the film, first by feeding the film and then by making a photograph while the film is held stationary. As the shaft 80 completes one revolution and one cycle of operation of the camera, cam 115 will operate to raise pad 105 away from the film, the feed mechanism will be restored to its starting position with ratchet arm 45 in the position shown in Fig. 3 and all other parts of the camera will be restored to the starting position.

A cam 141 is mounted on the rear end of shaft 80. This cam is in the form of a collar with a flat face arranged so that in the position of rest of shaft 80, as shown in the drawings, roller 142 carried by a pivoted actuating arm on microswitch 143 will be in a position in which the switch is open and the electric circuit therethrough broken. As soon as disc 121 and shaft 80 are released for one revolution to secure a cycle of operation of the camera, switch 143 is actuated to close an electric circuit to a suitable annunciator, not shown, for indicating to the operator in front of copy table 1, the period during which the camera is in operation. As soon as the cycle of operation of the camera is completed, roller 142 will again engage the flat face on cam 141 and open the circuit showing that operation of the camera mechanism has been completed.

For each different size of document photographed, the several parts will be adjusted including the camera, plates 18, the film feed and the objective before switch 126 is operated to secure a cycle of operation of the camera mechanism. After a number of pictures are taken in adjacent relation on the film strip, it may be found desirable to remove and develop the exposed portion of the film before completing the photographing of the entire length of film strip on supply spool 22. The camera herein disclosed provides for this by having small film removal door 36 arranged to be opened independently of door 11. Door 11 must be opened to place a film supply spool in position on spindle 23 to load the camera and initially feed the lead end of the film over the several idler rollers, the film guideway, feed drum 29 and attach the lead end to receiving spool 34. After this, door 11 is not again opened until the film on spool 22 is exhausted.

Before opening door 36 to remove exposed film on spool 34, it is necessary to wind a sufficient amount of unexposed film over the exposed film on spool 34 to prevent further exposure of the exposed portion of the film on spool 34 in removing the spool from spindle 38. Therefore, a suitable winding crank 144 is rotatably mounted in door 36 in axially aligned relation with spindle 38. This winding crank has a portion projecting through the door with a clutch portion on the inner end thereof arranged to interengage with complementary clutch portions on the free end of spindle 38. Winding crank 144 is arranged so that it is normally held in disengaged relation with respect to spindle 38 in which position the clutch portions on the spindle and crank will not be engaged. By manually moving crank 144 toward the end of spindle 38, the clutch portions may be engaged whereupon crank 144 may be rotated to wind film on receiving spool 34 through the operation of spindle 38 and the film feed mechanism. When the desired amount of film has been wound on spool 34 for the protection of the exposed film thereon, door 36 may then be opened by releasing latch 37 and the end of the film severed in any convenient manner whereupon spool 34 is removed from spindle 38 so that the film thereon may be taken to a dark room and developed in a well-known manner. An empty spool is placed on spindle 38 to provide a receiving spool 34 and the severed end of the film is then attached to this new receiving spool. Then door 36 is closed and winding crank 144 is again operated to wind a portion of film on to receiving spool 34 sufficient to provide for the continued feeding of film in the operation of the camera to take additional pictures of documents in the manner above described.

The invention claimed is:

1. In a photographic camera having an objective, a focal plane therefor, a shutter controlling photographing at said focal plane, and film feed means for intermittently feeding film through said focal plane, the combination of a film guideway having a guide plate formed with an exposure aperture and a central longitudinally extending groove in one face thereof, a pair of plates mounted in said groove in end to end relation having the side edges formed for interfitting longitudinal sliding cooperation with the side portions of said guide plate, and having the upper faces of said pair of plates and the upper faces of the side portions of said guide plate in coplanar relation, a rotary control member rotatably mounted at the central portion on a margin of said guide plate and having opposite ends extending above and below the plane of said plates, a pair of links each having one end pivotally connected to one end of said rotary control member and having the opposite end pivotally connected to one of said pair of plates, whereby manual rotation of said rotary control member slides said pair of plates through operation of said links to move the adjacent ends of said plates toward and from each other to vary the length of said exposure aperture in said guide plate.

2. In a photographic camera having an objective, a focal plane therefor, a shutter controlling photographing at said focal plane, and film feed means for intermittently feeding film through said focal plane having portions normally operable to feed a uniform amount of film through said focal plane, the combination of a film guideway having a flat guide plate formed with an exposure aperture, a pair of flat plates having the side portions formed for interengaged sliding cooperation with the side portions of said guide plate in coplanar end to end relation, means for moving said plates toward and from each other to vary the size of said exposure aperture in the direction of film feed, said guide plate and pair of plates cooperating to support and guide film thereon in the focal plane, an arm mounted on one of said pair of plates for movement therewith, a rotatable feed adjusting shaft mounted in said camera, a crank arm on one end of said shaft, said crank arm and said arm on said plate having interengaged means on the free ends for rotating said shaft during sliding movement of said pair of plates, and means actuated by said shaft for varying the feed of film by said film feed means according to the movement of said pair of plates.

3. In a photographic camera having an objective, a focal plane therefor, a shutter controlling photographing at said focal plane, and film feed means for intermittently feeding film through said focal plane having portions normally operable to feed a uniform amount of film through said focal plane, the combination of a film guideway having a flat guide plate formed with an exposure aperture, a pair of flat plates having the side portions formed for interengaged sliding cooperation with the side portions of said guide plate in coplanar end to end relation, means for moving said plates toward and from each other to vary the size of said exposure aperture in the direction of film feed, said guide plate and pair of plates cooperating to support and guide film thereon in the focal plane, an arm mounted on one of said pair of plates for movement therewith in laterally extending relation, a rotatable film feed adjusting shaft mounted in said camera, a crank arm on one end of said shaft, said crank arm and said arm on said plate having slidable interengaged pivot means on the free ends for rotating said shaft in movement of said pair of plates, a ratchet wheel forming part of said film feed means, a ratchet pawl forming part of said film feed means for engaging and rotating said ratchet wheel in oscillation in one direction, and a segment mounted to rotate about said ratchet wheel and retain said ratchet pawl in disengaged relation with said ratchet wheel, and means connecting said rotatable feed adjusting shaft to said segment for varying the position of said segment according to said shaft for varying film feed to correspond with the dimension of said exposure aperture between said pair of plates.

4. In a photographic camera, a film guideway comprising a substantially flat guide plate formed with an exposure aperture and a central longitudinal groove in one face thereof, a pair of plates mounted in said groove in end to end coplanar relation having the side edges formed for interfitting longitudinal sliding cooperation with the side portions of said guide plate forming said groove and having the upper faces of said pair of plates and the upper faces of the side portions of said guide plate formed in substantially flat coplanar relation for cooperation in forming a flat film guide face in the focal plane of the camera, a bar having its central portion rotatably mounted on one edge of said guide plate in the central portion and the ends extending in radial relation, a pair of links each having one end pivotally secured to one end of said bar extending in opposite directions from said bar toward opposite ends of said guideway and having the opposite ends of said links each pivotally connected to the outer end of one of said pair of plates, and means engaging the central portion of said bar manually operable to rotate said bar about its pivotal mounting on said guideway for moving said pair of plates toward or from each other through said links for decreasing or increasing the length of the exposure aperture through said guide plate.

5. In a photographing camera having a casing formed with an opening and a door mounted for movement between open and closed positions relative to said opening, a film guideway comprising a substantially flat guide plate mounted in said casing opposite said door and having an exposure aperture and a central longitudinal groove in one face thereof, a pair of plates mounted in said groove in end to end coplanar relation having the side edges formed for interfitting longitudinal sliding cooperation with the side portions of said guide plate forming said groove and having the upper faces of said pair of plates and the side portions of said guide plate formed in substantially flat coplanar relation to form a flat film guide surface on said guideway in the focal plane of the camera, a bar having its central portion rotatably mounted on said guide plate opposite the opening in said casing, and having the ends extending in radial relation, a pair of links each having one end pivotally connected to one end of said bar and the opposite end pivotally connected to the outer end of one of said pair of plates, said bar and link lying in substantially the same plane in perpendicular relation to said guide plate and said pair of plates, a hub portion on said bar projecting towards said opening in said casing, a handle rotatably mounted in said door having a portion on the inner face of said door formed for interengagement with said hub portion on said bar in complementary relation in the closed position of said door on said casing, whereby rotation of said handle will operate through said bar and links to move said pair of plates toward or from each other on said guide plate for decreasing or increasing the length of the exposure aperture in said guide plate while said pair of plates have the outer surface thereof maintained in coplanar relation with the guide plate in forming a flat film guide surface about said exposure aperture.

6. In a photographic camera having a film feed means for intermittently feeding film through a focal plane including a pawl and ratchet wheel operable to determine the amount of film intermittently fed through said focal plane, the combination of a film guideway having a flat guide plate formed with an exposure aperture, a pair of flat plates having the side portions formed for interengaged sliding cooperation with the side portions of said guide plate in coplanar end to end relation, manually operable means for moving said pair of plates toward and from each other to vary the size of said exposure aperture in the direction of film feed, a rotatable feed adjusting shaft mounted in said camera with its axis perpendicular to the plane of movement of said pair of plates, a crank arm extending radially from one end of said shaft, an arm rigidly mounted at one end of one of said pair of plates, a pin and slot connection between the free end of said crank arm and the free end of said last-mentioned arm, a segment controlling the engagement of said pawl with the ratchet wheel of said film feed mechanism, and means for connecting said feed adjusting shaft and segment for moving said segment according to the rotation of said shaft whereby movement of said pair of plates is transmitted through said shaft to said segment for controlling the amount of film fed by said film feed means so that it will correspond to the length of exposure opening defined by said pair of plates.

7. In a photographic camera having a film feed including a ratchet wheel and pawl for engagement therewith to determine the amount of film feed by the distance through which the pawl is operated in engagement with the ratchet wheel, the combination of a film guideway having a flat guide plate formed with an exposure aperture, a pair of flat plates having the side portions formed for interengaged sliding cooperation with the side portions of said guide plate in coplanar end to end relation, means for moving said plates toward and from each other to vary the size of said exposure aperture in the direction of film feed, said guide plate and pair of plates cooperating to support and guide film thereon in the focal plane of said camera, an arm mounted on one of said pair of plates for movement therewith, a rotatable feed adjusting shaft mounted in said camera with its axis in a plane perpendicular to the direction of movement of said pair of plates, a crank arm on one end of said shaft, an arm mounted on one of said pair of plates for movement therewith, interengaged means on the free ends of said arm and crank arm for rotating said shaft in movement of said pair of plates, a segment mounted to rotate about said ratchet wheel, and means connecting said rotatable feed adjusting shaft to said segment for varying the position of said segment according to the rotation of said shaft and the movement of said pair of plates for varying film feed through the control of the engagement of said pawl with said ratchet wheel to provide film feed to correspond with the length of said exposure aperture between said pair of plates.

8. In a photographic camera, a film guideway formed of a plurality of plates interengaged with each other and formed to provide an exposure aperture and a flat film guiding face in the focal plane of said camera on one side thereof, a pad for holding film in said focal plane against the flat face of said guideway formed with a flat face in opposed relation to said flat face of said guideway, a pair of arms independently pivoted on one margin of said guideway in spaced relation and carrying said pad in the free ends thereof, resilient means operating said arms to normally and independently move said pad to engage the flat face thereon with said guideway to engage and hold film in said focal plane on said guideway, and an actuating member pivotally mounted on said guideway having portions adapted to engage said arms operable to move said pad away from said guideway through engagement and operation of said arms against the action of said resilient means to hold said pad in spaced relation to said guideway during film feeding operation.

9. In a photographic camera, a film guideway having a plate formed with an aperture and a flat face forming a focal plane against which film may be held in said focal plane, a pair of arms pivotally mounted on one margin of said plate in coaxial spaced independent relation, a pad mounted for relative movement at opposite ends in the free ends of said arm and having a flat face opposed to the flat face of said guideway about said aperture, a pair of arms extending laterally from and each carried by one of said first-mentioned arms, resilient means independently operating said arms for moving said pad toward said guideway to normally hold film against the flat face of said guideway in the focal plane of said camera, an actuating member pivotally mounted in coaxial relation with said first-mentioned pair of arms on said guide plate, having parts formed to engage said second-mentioned pair of arms in movement of said actuating member in one direction for moving the first-mentioned pair of arms on their pivotal mounting for moving said pad away from said guide plate and support in spaced relation thereto during movement of said film over said guide plate.

AMBROSIUS BRIECHLE.
ERNEST C. WORDEN.

REFERENCES CITED

The following references are of record in the file of this patent:

UNITED STATES PATENTS

| Number | Name | Date |
|---|---|---|
| 338,541 | McIndoe | Mar. 28, 1886 |
| 1,656,138 | Breslauer | Jan. 10, 1928 |
| 1,847,531 | Kesses | Mar. 1, 1932 |
| 1,992,492 | Lloyd | Feb. 26, 1935 |
| 2,003,691 | Lundberg | June 4, 1935 |
| 2,049,041 | Berggren | July 28, 1936 |
| 2,073,627 | Draeger | Mar. 16, 1937 |
| 2,099,681 | Draeger | Nov. 23, 1937 |
| 2,113,580 | Draeger | Apr. 12, 1938 |
| 2,369,247 | Pratt | Feb. 13, 1945 |